(12) United States Patent
Page et al.

(10) Patent No.: US 6,390,293 B1
(45) Date of Patent: May 21, 2002

(54) VEHICLE ORGANIZING DEVICE

(76) Inventors: Perry L. Page, 192 Southwood Dr., Gilbertsville, KY (US) 42044; Patricia A. Page, P.O. Box 1134, Springfield, TN (US) 37172

(*) Notice: Subject to any disclaimer, the term of this patent is extended or adjusted under 35 U.S.C. 154(b) by 42 days.

(21) Appl. No.: 09/595,462

(22) Filed: Jun. 16, 2000

(51) Int. Cl.[7] .............................................. B65D 69/00
(52) U.S. Cl. ........................ 206/225; 206/335; 224/275; 296/37.1
(58) Field of Search ................................. 206/223, 229, 206/233, 1.7–1.9, 214, 224, 371, 812, 335, 225; 224/277, 275, 926, 483; 242/596.1, 596.5, 560, 561; 296/37.1; 211/16, 45

(56) References Cited

U.S. PATENT DOCUMENTS

| | | | |
|---|---|---|---|
| 2,741,048 A | * | 4/1956 | Shelton ...................... 206/1.7 |
| 3,244,125 A | | 4/1966 | Mackey |
| 3,887,103 A | * | 6/1975 | Spooner ...................... 206/229 |
| 4,254,872 A | | 3/1981 | Garrett |
| D264,525 S | | 5/1982 | Page, Jr. |
| 4,406,368 A | * | 9/1983 | Hermes ...................... 206/371 |
| 4,512,503 A | | 4/1985 | Gioso |
| 5,024,705 A | * | 6/1991 | Cahill ........................ 206/229 |
| 5,205,452 A | | 4/1993 | Mankey |
| 5,215,193 A | * | 6/1993 | Dennis ....................... 206/229 |
| 5,551,616 A | | 9/1996 | Stitt et al. |
| 5,941,381 A | * | 8/1999 | James ........................ 206/229 |
| 6,135,276 A | * | 10/2000 | French et al. ............... 206/229 |

* cited by examiner

*Primary Examiner*—Luan K. Bui

(57) ABSTRACT

A vehicle organizing device for holding a paper towel roll. The vehicle organizing device includes a housing. The housing has a bottom wall, a top wall, a front wall, a back wall, a first side wall and a second side wall. The housing is substantially solid. A securing means releasably holds a paper towel roll rotatably to the housing. A plurality of wells extends into the top wall.

18 Claims, 2 Drawing Sheets

VEHICLE ORGANIZING DEVICE

BACKGROUND OF THE INVENTION

1. Field of the Invention

The present invention relates to vehicle organizing devices and more particularly pertains to a new vehicle organizing device for holding a paper towel roll.

2. Description of the Prior Art

The use of vehicle organizing devices is known in the prior art. More specifically, vehicle organizing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,551,616; 5,205,452; 4,512,503; 4,254,872; U.S. Des. Pat. No. 264,525; and U.S. Pat. No. 3,244,125.

While these devices fulfill their respective, particular objectives and requirements, the aforementioned patents do not disclose a new vehicle organizing device. The inventive device includes a housing. The housing has a bottom wall, a top wall, a front wall, a back wall, a first side wall and a second side wall. The housing is substantially solid. A securing means releasably holds a paper towel roll rotatably to the housing. A plurality of wells extends into the top wall.

In these respects, the vehicle organizing device according to the present invention substantially departs from the conventional concepts and designs of the prior art, and in so doing provides an apparatus primarily developed for the purpose of holding a paper towel roll.

SUMMARY OF THE INVENTION

In view of the foregoing disadvantages inherent in the known types of vehicle organizing devices now present in the prior art, the present invention provides a new vehicle organizing device construction wherein the same can be utilized for holding a paper towel roll.

The general purpose of the present invention, which will be described subsequently in greater detail, is to provide a new vehicle organizing device apparatus and method which has many of the advantages of the vehicle organizing devices mentioned heretofore and many novel features that result in a new vehicle organizing device which is not anticipated, rendered obvious, suggested, or even implied by any of the prior art vehicle organizing devices, either alone or in any combination thereof.

To attain this, the present invention generally comprises a housing. The housing has a bottom wall, a top wall, a front wall, a back wall, a first side wall and a second side wall. The housing is substantially solid. A securing means releasably holds a paper towel roll rotatably to the housing. A plurality of wells extends into the top wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle organizing device apparatus and method which has many of the advantages of the vehicle organizing devices mentioned heretofore and many novel features that result in a new vehicle organizing device which is not anticipated, rendered obvious, suggested, or even implied by any of the prior art vehicle organizing devices, either alone or in any combination thereof.

It is another object of the present invention to provide a new vehicle organizing device which may be easily and efficiently manufactured and marketed.

It is a further object of the present invention to provide a new vehicle organizing device which is of a durable and reliable construction.

An even further object of the present invention is to provide a new vehicle organizing device which is susceptible of a low cost of manufacture with regard to both materials and labor, and which accordingly is then susceptible of low prices of sale to the consuming public, thereby making such vehicle organizing device economically available to the buying public.

Still yet another object of the present invention is to provide a new vehicle organizing device which provides in the apparatuses and methods of the prior art some of the advantages thereof, while simultaneously overcoming some of the disadvantages normally associated therewith.

Still another object of the present invention is to provide a new vehicle organizing device for holding a paper towel roll.

Yet another object of the present invention is to provide a new vehicle organizing device which includes a housing. The housing has a bottom wall, a top wall, a front wall, a back wall, a first side wall and a second side wall. The housing is substantially solid. A securing means releasably holds a paper towel roll rotatably to the housing. A plurality of wells extends into the top wall.

Still yet another object of the present invention is to provide a new vehicle organizing device that has protruding members for holding a plurality of pairs of eyeglasses.

Even still another object of the present invention is to provide a new vehicle organizing device that has multiple sized wells for holding various items.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent When consideration is given to the following detailed description thereof. Such description makes reference to the annexed drawings wherein.

DESCRIPTION OF THE PREFERRED EMBODIMENT

Figure 1:
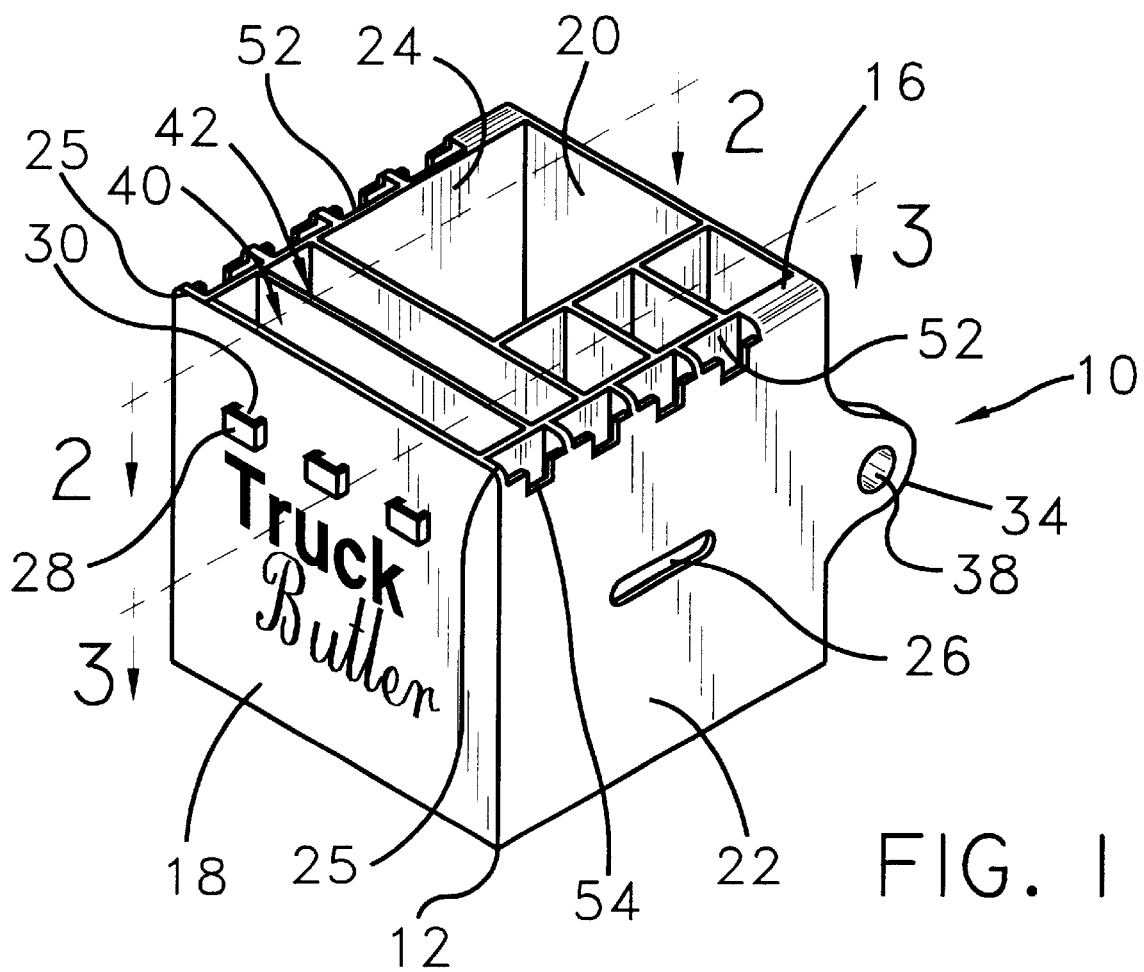
FIG. 1 is a schematic perspective view of a new vehicle organizing device according to the present invention.
Figure 4:
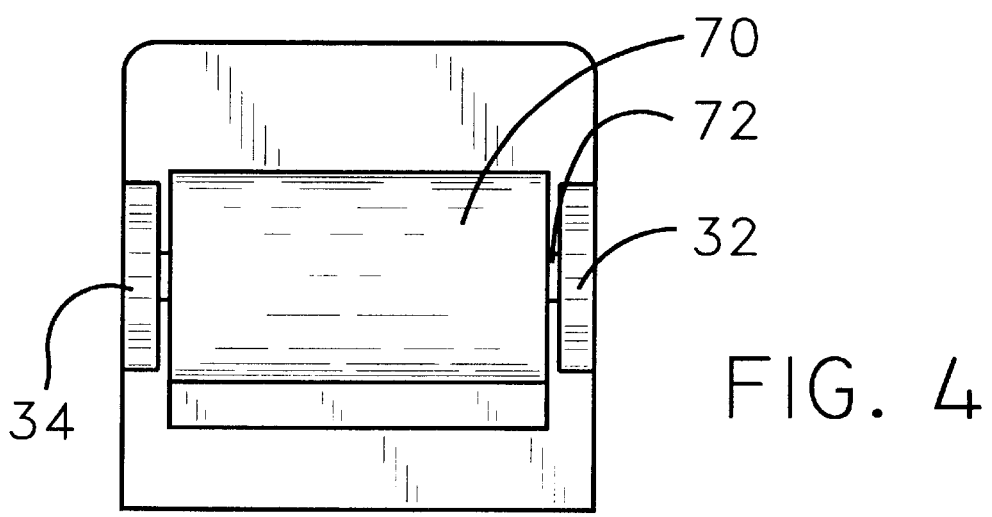
FIG. 4 is a schematic back view of the present invention.
Figure 2:
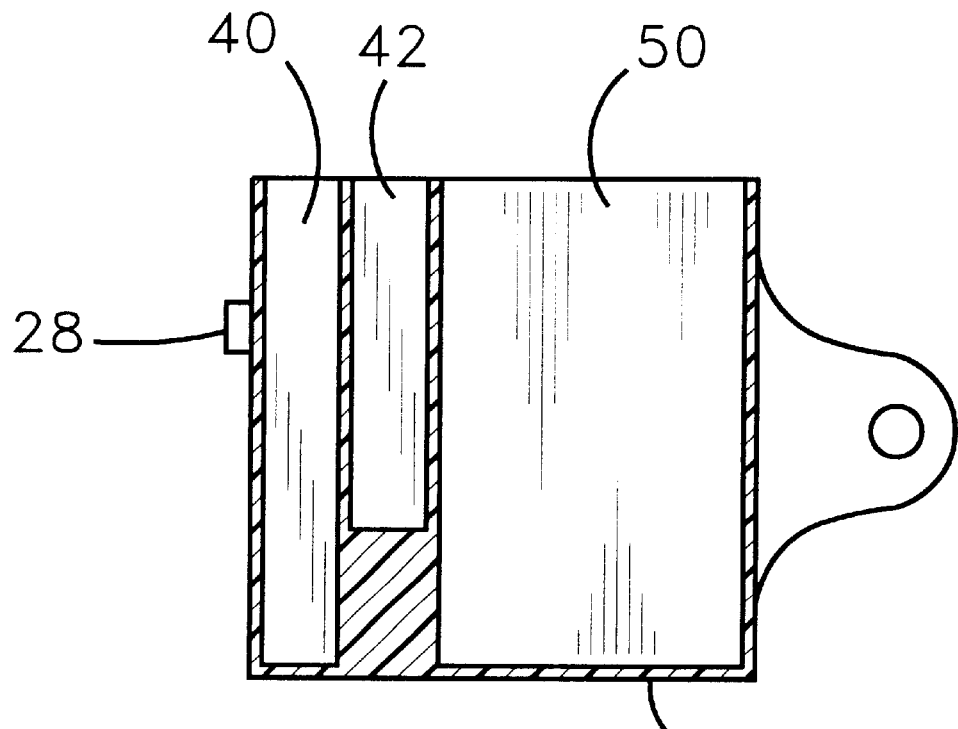
FIG. 2 is a schematic side cross-sectional view taken along line 2—2 of the present invention.
Figure 3:
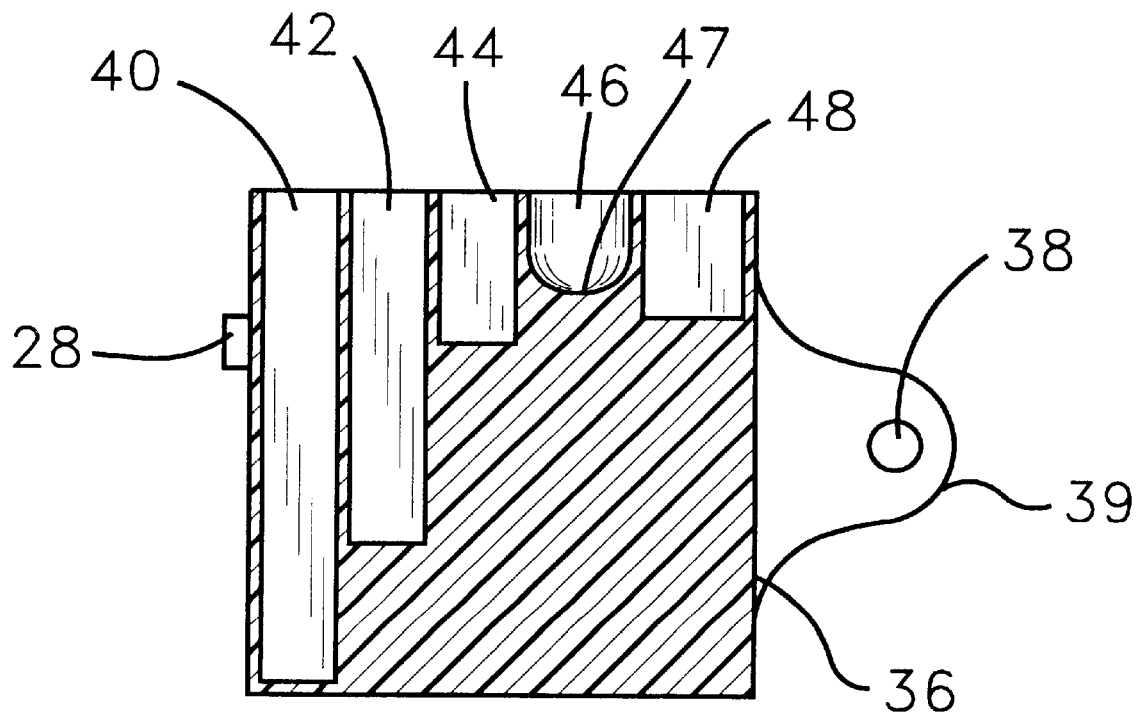
FIG. 3 is a schematic side cross-sectional view taken along line 3—3 of the present invention.

With reference now to the drawings, and in particular to FIGS. 1 through 4 thereof, a new vehicle organizing device embodying the principles and concepts of the present invention and generally designated by the reference numeral 10 will be described.

As best illustrated in FIGS. 1 through 4, the vehicle organizing device 10 generally comprises a housing 12. The housing 12 has a bottom wall 14, a top wall 16, a front wall 18, a back wall 20, a first side wall 22 and a second side wall 24. The housing 12 is substantially solid. Each of the side walls 22, 24 has a slot 26 extending therein. Each of the slots 26 is positioned in a central portion of the side walls 22, 24 and act as handles. Each of the walls has a length generally between 12 and 18 inches. The side walls 22, 24 back wall 20 and front wall 18 each preferably has a height generally between 12 and 18 inches.

A plurality of protruding members 28 is integrally coupled to and extends away from an outside surface of the front wall 18. Each of the protruding members 28 is positioned relatively nearer the top wall 16 than the bottom wall 14. Each of the protruding members 28 is spaced and generally positioned along a line orientated parallel to a plane of the bottom wall 14. The protruding members 28 each have a hole 30 therethrough. Each of the holes 30 has a line extending therethrough. The lines are each orientated generally perpendicular to the plane of the bottom wall 14. The temple member of a pair of eyeglasses may be extended through one of the holes 30 so that the protruding member 28 releasably holds the eyeglasses.

A securing means releasably holds a paper towel roll 70 rotatably to the housing 12. The securing means comprises a pair of brackets 32, 34. Each of the brackets 32, 34 has an edge 36 integrally coupled to the housing 12. A first 32 of the brackets is located at a juncture of the second side wall 24 and the back wall 20. A second 34 of the brackets is located at a juncture of the first side wall 22 and the back wall 20. Each of the brackets 32, 34 extends away from the housing 12 in a generally parallel direction. Each of the brackets lies in plane orientated generally perpendicular to the back wall 20. The brackets have an opening 38 therethrough. The openings 38 are generally diametrically opposed to each other. A conventional extendable dowel 72, having a biasing means therein as found in use for holding toilet paper and the such, is extended between and rotatably coupled to the openings 38 such that the dowel 72 may extend through the paper tower roll 70. A free edge 39 of the brackets is preferably rounded.

A plurality of wells extends into the top wall 16. The plurality of wells includes a first well 40 that is positioned generally adjacent to the front wall 18 and generally extends between the side walls 22, 24. The first well 40 extends downwardly to the bottom wall 14.

A second well 42 is positioned generally adjacent to the first well 40 and generally extends between the side walls 22, 24. The second well 42 has a depth equal to at least ½ the depth of the first well 40. The first 40 and second 42 wells may be used for holding maps and trucking logs.

A utensil well 44, such as for holding pens and pencils, is positioned generally adjacent to the second well 42 and generally adjacent to the first side wall 22. The utensil well 44 preferably has a depth equal to less than ⅓ the height of the first side wall 22.

A change well 46, for holding coins, is positioned generally adjacent to the utensil well 44 and generally adjacent to the first side wall 22. The change well 46 has a depth equal to less than ⅓ the height of the first side wall 22. The change well 46 has a generally concave bottom surface 47.

A receipt well 48, for holding small items of paper, is generally positioned adjacent to the back wall 20, the first side wall 22 and the change well 46. The receipt well 48 has a depth equal to less than ⅓ the height of the first side wall 22.

A container well 50, for holding beverage containers or other large items, extends between the back wall 20, the second well 42 and between the change wall 46 and the second side wall 24. The container well 50 extends downwardly to the bottom wall.

A plurality of tape wells 52 extend into a top edge 25 of each of the side walls 22, 24. The tape wells 52 are generally aligned along a line between the front 18 and back 20 walls. Each of the tape wells 52 has a length generally between 2 and 4 inches and a depth generally between 3 and 5 inches such that each of the tape wells have a size adapted to hold a conventional audio cassette. Ideally, there are four of the tape wells 52 positioned adjacent to each of the side walls 22, 24. Preferably, the side walls 22, 24 have depressions 54 in their top edges corresponding to each of the tape wells 52 for easy access to the wells.

In use, the device 10 is placed by the seat of the driver and is suited well for truck drivers. Items are placed in the appropriate wells and easily retrieved when needed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A vehicle organizing container device, said device being adapted to removably hold a paper towel roll, said device comprising:
   a housing having a bottom wall, a top wall, a front wall, a back wall, a first side wall and a second side wall, said housing being substantially solid;
   a securing means for releasable holding said paper towel roll rotatably to said housing, said securing means being attached to said front wall of said housing;
   a plurality of protruding members being integrally coupled to and extending away from an outside surface of said back wall, each of said protruding members being positioned relatively nearer said top wall than said bottom wall, each of said protruding members having a hole therethrough, said hole being defined by a continuous edge; and
   a plurality of wells extending into said top wall.

2. The vehicle organizing container device as in claim 1, wherein each of said side walls has a slot extending therein, each of said slots being positioned in a central portion of said side walls.

3. The vehicle organizing container device as in claim 1, wherein each of said walls has a length generally between 12 and 18 inches, said side walls, back wall and front wall each having a height generally between 12 and 18 inches.

4. The vehicle organizing container device as in claim 1, wherein said securing means includes a pair of brackets, each of said brackets having an edge integrally coupled to said housing, a first of said brackets being located at a juncture of said second side wall and said back wall, a second of said brackets being located at a juncture of said first side wall and said back wall, each of said brackets extending away from said housing in a generally parallel direction, each of said brackets having an opening therethrough, said openings being generally diametrically opposed to each other, wherein a dowel is extended between and rotatably coupled to said openings such that said dowel may extend through said paper tower roll.

5. The vehicle organizing container device as in claim 1, wherein said securing means includes a pair of brackets, each of said brackets having an edge integrally coupled to said housing, a first of said brackets being located at a juncture of said second side wall and said back wall, a second of said brackets being located at a juncture of said first side wall and said back wall, each of said brackets extending away from said housing in a generally parallel direction, each of said brackets having an opening therethrough, said openings being generally diametrically opposed to each other, wherein a dowel is extended between and rotatably coupled to said openings such that said dowel may extend through said paper tower roll.

6. The vehicle organizing container device as in claim 1, wherein two of said wells includes a first well and a second well, said first well being positioned generally adjacent to said front wall and generally extending between said side walls, said first well extending downwardly to said bottom wall, said second well being positioned generally adjacent to said first well and generally extending between said side walls, said second well having a depth equal to at least ½ the depth of said first well.

7. The vehicle organizing container device as in claim 6, wherein another of said wells includes a utensil well, said utensil well being generally positioned adjacent to said second well and generally adjacent to said first side wall, said utensil well having a depth equal to less than ⅓ a height of said first side wall.

8. The vehicle organizing container device as in claim 6, wherein another of said wells includes a change well, said change well being positioned generally between said second well and said back wall and generally adjacent to said first side wall, said change well having a depth equal to less than ⅓ the height of said first side wall, said change well having a generally concave bottom surface.

9. The vehicle organizing container device as in claim 8, wherein another of said wells includes a receipt well, said receipt well being generally positioned adjacent to said back wall, said first side wall and said change well, said receipt well having a depth equal to less than ⅓ the height of said first side wall.

10. The vehicle organizing container device as in claim 8, wherein another of said wells includes container well, said container well extending between said back wall, said second well and between said change wall and said second side wall, said container well extending downwardly to said bottom wall.

11. The vehicle organizing container device as in claim 6, wherein a portion of said wells includes a plurality of tape wells extending into a top edge of each of said side walls, said tape wells being generally aligned along a line between said front and back walls, each of said tape wells having a length generally between 2 and 4 inches and a depth generally between 3 and 5 inches such that each of said tape wells have a size adapted to hold an audio cassette.

12. The vehicle organizing container device as in claim 6, wherein one of said wells includes a utensil well, said utensil well being generally positioned adjacent to said first side wall, said utensil well having a depth equal to less than ⅓ a height of said first side wall.

13. The vehicle organizing container device as in claim 1, wherein one of said wells includes a change well, said change well having a depth equal to less than ⅓ the height of said first side wall, said change well having a generally concave bottom surface.

14. The vehicle organizing container device as in claim 13, wherein another of said wells includes a receipt well, said receipt well being generally positioned adjacent to said back wall, said first side wall and said change well, said receipt well having a depth equal to less than ⅓ the height of said first side wall.

15. The vehicle organizing container device as in claim 14, wherein another of said wells includes container well, said container well extending between said back wall, said second well and between said change wall and said second side wall, said container well extending downwardly to said bottom wall.

16. The vehicle organizing container device as in claim 15, wherein a portion of said includes a plurality of tape wells extending into a top edge of each of said side walls, said tape wells being generally aligned along a line between said front and back walls, each of said tape wells having a length generally between 2 and 4 inches and a depth generally between 3 and 5 inches such that each of said tape wells have a size adapted to hold an audio cassette.

17. The vehicle organizing container device as in claim 1, wherein a portion of said wells includes a plurality of tape wells extending into a top edge of each of said side walls, said tape wells being generally aligned along a line between said front and back walls, each of said tape wells having a length generally between 2 and 4 inches and a depth generally between 3 and 5 inches such that each of said tape wells have a size adapted to hold an audio cassette.

18. A vehicle organizing container device, said device being adapted to removably hold a paper towel roll, said device comprising:

a housing having a bottom wall, a top wall, a front wall, a back wall, a first side wall and a second side wall, said housing being substantially solid, each of said side walls having a slot extending therein, each of said slots being positioned in a central portion of said side walls, each of said walls having a length generally between 12 and 18 inches, said side walls, back wall and front wall each having a height generally between 12 and 18 inches;

a plurality of protruding members being integrally coupled to and extending away from an outside surface of said front wall, each of said protruding members being positioned relatively nearer said top wall than said bottom wall, each of said protruding members being spaced and generally positioned along a line orientated parallel to a plane of said bottom wall, each of said protruding members having a hole therethrough, each of said holes having a line extending therethrough orientated generally perpendicular to said plane of said bottom wall;

a securing means for releasable holding said paper towel roll rotatably to said housing, said securing means comprising a pair of brackets, each of said brackets having an edge integrally coupled to said housing, a first of said brackets being located at a juncture of said second side wall and said back wall, a second of said brackets being located at a juncture of said first side wall and said back wall, each of said brackets extending away from said housing in a generally parallel direction, each of said brackets lying in plane orientated generally perpendicular to said back wall, each of said brackets having an opening therethrough, said openings being generally diametrically opposed to each other, wherein a dowel is extended between and rotatably coupled to said openings such that said dowel may extend through said paper tower roll;

a plurality of wells extending into said top wall, said plurality of wells comprising;

a first well being positioned generally adjacent to said front wall and generally extending between said side walls, said first well extending downwardly to said bottom wall;

a second well being positioned generally adjacent to said first well and generally extending between said side walls, said second well having a depth equal to at least ½ the depth of said first well;

a utensil well being generally positioned adjacent to said second well and generally adjacent to said first side wall, said utensil well having a depth equal to less than ⅓ the height of said first side wall;

a change well being positioned generally adjacent to said utensil well and generally adjacent to said first side wall, said change well having a depth equal to less than ⅓ the height of said first side wall, said change well having a generally concave bottom surface;

a receipt well being generally positioned adjacent to said back wall, said first side wall and said change well, said receipt well having a depth equal to less than ⅓ the height of said first side wall;

a container well extending between said back wall, said second well and between said change wall and said second side wall, said container well extending downwardly to said bottom wall; and a plurality of tape wells extending into a top edge of each of said side walls, said tape wells being generally aligned along a line between said front and back walls, each of said tape wells having a length generally between 2 and 4 inches and a depth generally between 3 and 5 inches such that each of said tape wells have a size adapted to hold an audio cassette, wherein there are four of said tape wells positioned adjacent to each of said side walls.

* * * * *